United States Patent
Park et al.

(10) Patent No.: US 7,890,334 B2
(45) Date of Patent: Feb. 15, 2011

(54) SYSTEM AND METHOD FOR CONTROLLING VOICE DETECTION OF NETWORK TERMINAL

(75) Inventors: Young-Hee Park, Seoul (KR); Hyun-Soo Kim, Yongin-si (KR); Hyun-Sik Shim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 963 days.

(21) Appl. No.: 11/705,802

(22) Filed: Feb. 13, 2007

(65) Prior Publication Data

US 2007/0201639 A1     Aug. 30, 2007

(30) Foreign Application Priority Data

Feb. 14, 2006    (KR) ................ 10-2006-0014386

(51) Int. Cl.
*G10L 15/22* (2006.01)
(52) U.S. Cl. .................. 704/275; 704/270.1
(58) Field of Classification Search ............ 704/270, 704/270.1, 275
See application file for complete search history.

(56) References Cited

U.S. PATENT DOCUMENTS

| | | | |
|---|---|---|---|
| 4,400,584 A * | 8/1983 | Vilmur ............... | 455/79 |
| 6,330,539 B1 * | 12/2001 | Takayama et al. ......... | 704/275 |
| 6,988,070 B2 * | 1/2006 | Kawasaki et al. ......... | 704/275 |
| 7,076,430 B1 * | 7/2006 | Cosatto et al. ........... | 704/275 |
| 7,092,886 B2 * | 8/2006 | Squibbs .................. | 704/270 |
| 7,464,035 B2 * | 12/2008 | Funk et al. ............. | 704/275 |
| 2004/0030560 A1 * | 2/2004 | Takami et al. ........... | 704/275 |
| 2006/0106615 A1 * | 5/2006 | Tateishi et al. .......... | 704/275 |
| 2007/0011007 A1 * | 1/2007 | Greene et al. ........... | 704/246 |

FOREIGN PATENT DOCUMENTS

| | | |
|---|---|---|
| JP | 2002-120184 | 4/2002 |
| KR | 102002005066 | 6/2002 |
| KR | 102004007749 | 9/2004 |
| KR | 102005002626 | 3/2005 |
| KR | 102005003633 | 4/2005 |

* cited by examiner

*Primary Examiner*—Abul Azad
(74) *Attorney, Agent, or Firm*—The Farrell Law Firm, P.C.

(57) ABSTRACT

Provided is a system and method for controlling voice detection of a network terminal. The system includes the network terminal for, if detection of a voice signal is requested, detecting voice by receiving and setting a voice detection setting value corresponding to a predetermined service and generating a trigger signal for the voice detection according to the voice detection setting value corresponding to the service; and a server for determining the service of the network terminal and transmitting the voice detection setting value corresponding to the service to the network terminal. Accordingly, by controlling to commence voice detection according to a service, voice detection optimized to a relevant service can commence.

22 Claims, 7 Drawing Sheets

SYSTEM AND METHOD FOR CONTROLLING VOICE DETECTION OF NETWORK TERMINAL

PRIORITY

This application claims priority under 35 U.S.C. §119 to an application entitled "System and Method for Controlling Voice Detection of Network Terminal" filed in the Korean Intellectual Property Office on Feb. 14, 2006 and assigned Ser. No. 2006-14386, the contents of which are incorporated herein by reference.

BACKGROUND OF THE INVENTION

1. Field of the Invention

The present invention relates generally to a network terminal system, and in particular, to a system and method for controlling voice detection of a network terminal.

2. Description of the Related Art

A network terminal system is a system in which a server can control a terminal via a network. In the network terminal system, the terminal operates according to a control signal of the server via the network.

In the network terminal system, a service using voice recognition can be provided. A conventional network terminal uses a method of performing voice detection by opening a microphone either continuously or at every necessary time according to a service characteristic or an operation policy.

In the method of performing voice detection by opening a microphone continuously, since voice detection time is inaccurate, recognition performance can decrease, and since all voice including necessary voice is transmitted via the network, transmitting voice undesired by a user can violate privacy. Whereas, in the method of performing voice detection by opening a microphone at every necessary time, recognition performance can be guaranteed. The latter method can be used in systems providing services in which voice input can be correctly counted, however, a user must continuously trigger an input signal in systems not providing such a service.

The network terminal, using voice, can provide various services, thus if only one method of performing voice detection by opening a microphone continuously or only at every necessary time is used, voice input methods differentiated according to services cannot be used.

SUMMARY OF THE INVENTION

An object of the present invention is to substantially solve at least the above described problems and/or disadvantages and to provide at least the advantages described below. Accordingly, an aspect of the present invention is to provide a system and method for controlling voice detection of a network terminal in order to control that voice detection is performed according to a voice detection time optimized to each service.

Another aspect of the present invention is to provide a system and method for controlling voice detection of a network terminal in order to allow a server to control a voice detection time for preventing disorder due to a mixture of voice detection signals from the server and the network terminal.

According to an aspect of the present invention, there is provided a system for controlling voice detection of a network terminal, the system including the network terminal for, if detection of a voice signal is requested, detecting voice by receiving and setting a voice detection setting value corresponding to a predetermined service and generating a trigger signal for the voice detection according to the voice detection setting value corresponding to the service; and a server for determining the service of the network terminal and transmitting the voice detection setting value corresponding to the service to the network terminal.

According to another aspect of the present invention, there is provided a method of controlling voice detection of a network terminal, the method including receiving, by the network terminal, a voice detection setting value corresponding to a predetermined service from a server; and if detection of a voice signal is requested, detecting voice by generating a trigger signal for the voice detection according to the voice detection setting value corresponding to the service.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
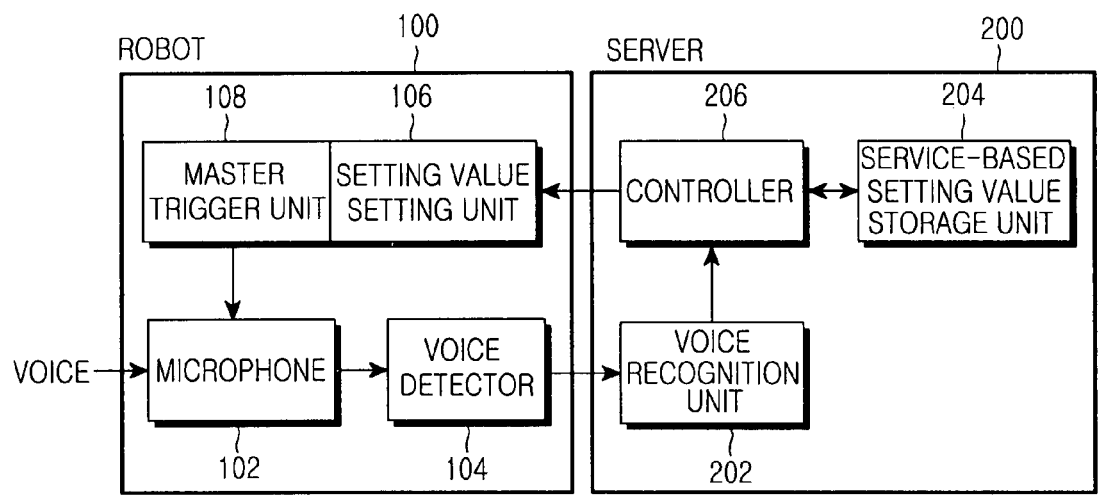
FIG. 1 is a block diagram of a system for controlling voice detection of a network robot according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

In a system for controlling voice detection of a network terminal according to the present invention, the network terminal is a device whose operation is controlled by a server via a network and can be, for example, a cellular phone or a robot. Hereinafter, it is assumed that the network terminal is a robot. Notwithstanding, the network terminal can be every device having a function by which an operation of the device is controlled by a server via a network.

FIG. 1 is a block diagram of a system for controlling voice detection of a network robot according to the present invention. Referring to FIG. 1, in the system for controlling voice detection of a network robot, when voice detection of a robot 100 is needed, a server 200 transmits a master trigger signal for commanding the robot 100 to commence voice detection. The master trigger signal can be a master trigger enable signal or a master trigger disable signal. The master trigger enable signal enables the robot 100 to commence the voice detection so that a state of the robot 100 can be self controlled or controlled by the server 200. The master trigger disable signal disables the voice detection until the robot 100 receives the master trigger enable signal from the server 200. Upon receipt of the master trigger enable signal, the robot 100 enters into a state to commence voice detection, and when a voice detection start signal is received, the voice detection can commence using a default voice detection setting value stored in the robot 100. The server 200 stores voice detection setting values corresponding to various services. When the robot 100 commences voice detection, the server 200 determines a service of the robot 100 and transmits a voice detection setting value corresponding to the determined service to the robot 100, thereby enabling the robot 100 to set a proper voice detection setting value for the determined service. Each of the voice detection setting values corresponding to various services can include the number of voice detections, a voice detectable duration length, and a voice undetectable duration length according to a relevant service.

The robot 100 commences voice detection according to a signal, such as a switch operation, a voice call, or hand waving by a user, or a voice detection start request of the server 200. Herein, referring to FIG. 1, a master trigger unit 108 of the robot 100 must be enabled. For example, when the user operates a switch (a touch pad or a remote control) installed in the outside of the robot 100, the robot 100 can commence voice detection by determining the switch operation as an input of the voice detection start signal, or when the user transmits a signal, such as calling a name of the robot 100, the robot 100 can commence voice detection by determining the signal as an input of the voice detection start signal. The robot 100 can also commence voice detection upon receipt of the voice detection start signal from the server 200. The robot 100 stores the default voice detection setting value, and when voice detection commences due to the user; the robot 100 performs the voice detection by generating voice detection triggers according to the default voice detection setting value. In addition, when the voice detection commences due to the server 200, the robot 100 performs the voice detection by receiving a voice detection setting value corresponding to a predetermined service and generating triggers according to the voice detection setting value corresponding to the service. That is, the robot 100 performs the voice detection by generating triggers according to the number of voice detections, a voice detectable duration length, and a voice undetectable duration length corresponding to the service.

The robot 100 can generate a single trigger or multi triggers according to a service. The single trigger is to perform the voice detection once, and the multi triggers are to perform the voice detection several times in every constant interval. When the single trigger is generated, the robot 100 performs the voice detection once by opening a microphone 102 once for a predetermined time or until a voice detection end (End-Point Detection (EPD)) time, and when the multi triggers are generated, the robot 100 performs the voice detection several times by repeatedly opening the microphone 102 for a predetermined time and closing same.

Configurations of the server 200 and the robot 100 will now be described herein in detail. The robot 100 includes the microphone 102, a voice detector 104, a setting value setting unit 106, and the master trigger unit 108.

The microphone 102 is opened or closed according to a voice detection trigger signal generated when the master trigger unit 108 is enabled. When the microphone 102 is open, the microphone 102 receives a user's voice and outputs a voice signal corresponding to the user's voice to a voice detector 104. The voice detector 104 detects the voice signal input from the microphone 102 and transmits the detected voice signal to the server 200.

The setting value setting unit 106 stores the default voice detection setting value, and if a voice detection setting value corresponding to a predetermined service is received from the server 200, the setting value setting unit 106 selects the received voice detection setting value as a voice detection setting value corresponding to the service.

The master trigger unit 108 sets a state thereof according to a master trigger signal (e.g., enable signal or disable signal) received from the server 200. Upon receipt of a master trigger enable signal from the server 200, the master trigger unit 108 enters into an on-state and enables to commence voice detection, and if a master trigger disable signal is received from the server 200, the master trigger unit 108 enters into an off-state and does not allow the microphone 102 to be open in any case. If the default voice detection setting value is set by the setting value setting unit 106 when a trigger is generated, the master trigger unit 108 generates the trigger according to the default voice detection setting value, and if a voice detection setting value corresponding to a predetermined service is set when a trigger is generated, the master trigger unit 108 generates the trigger according to the voice detection setting value corresponding to the service.

The server 200 includes a voice recognition unit 202, a service-based setting value storage unit 204, and a controller 206.

The voice recognition unit 202 receives a voice signal detected by the voice detector 104 of the robot 100 from the robot 100 and recognizes the received voice.

The service-based setting value storage unit 204 stores voice detection setting values predetermined according to services. Each of the voice detection setting values corresponding to the services can include the number of voice detections, a voice detectable duration length, and a voice undetectable duration length according to a relevant service.

The controller 206 determines whether voice detection of the robot 100 is enabled or disabled and transmits a master trigger signal to the robot 100. The controller 206 determines a service performed by the robot 100, selects a voice detection setting value corresponding to the service performed by the robot 100 from among the voice detection setting values stored in the service-based setting value storage unit 204, and transmits the selected voice detection setting value to the robot 100.

Figure 4:
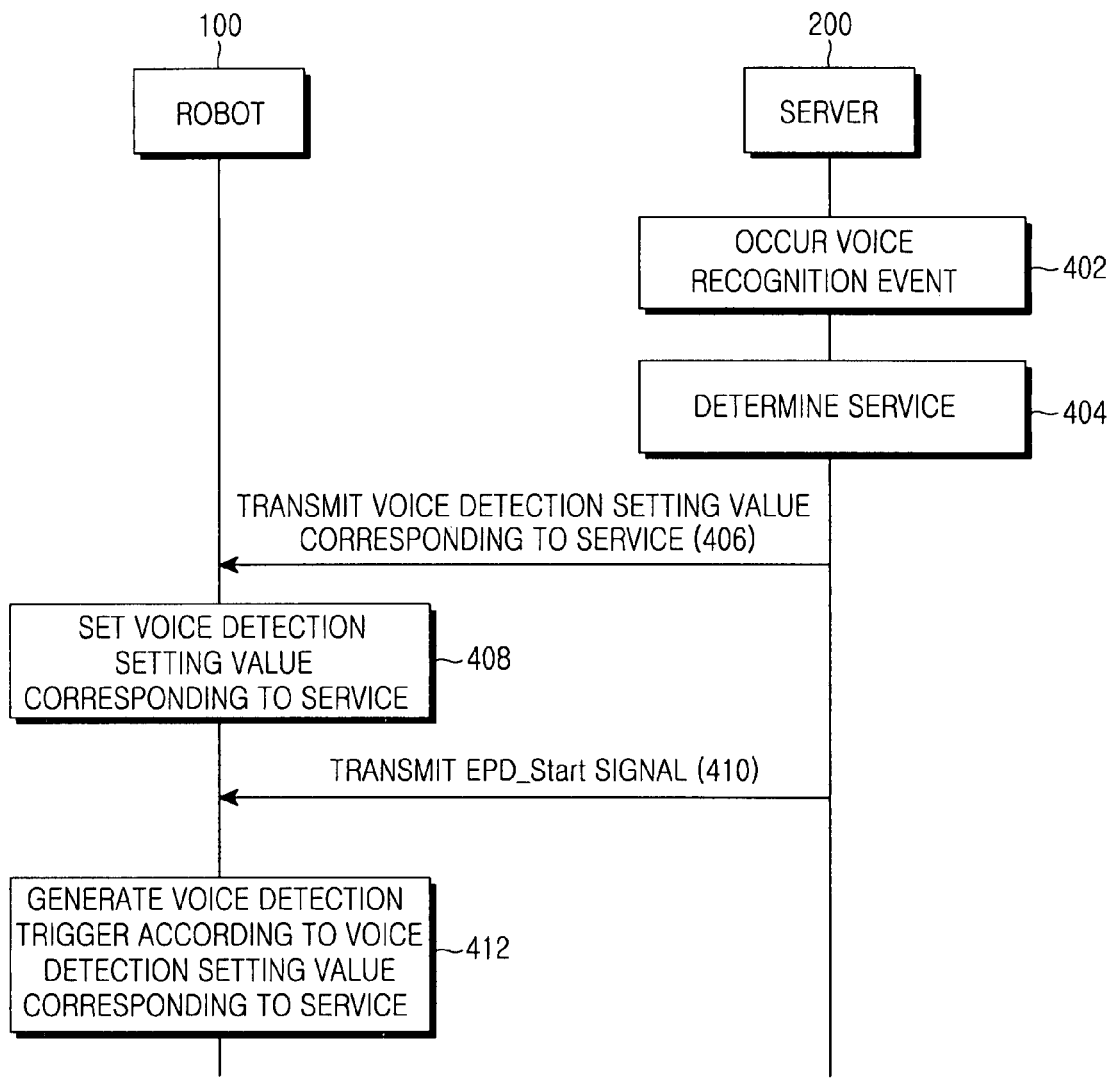
FIG. 4 is a signaling diagram illustrating a method of controlling voice detection of a network robot according to the present invention.

A process for the robot 100 and the server 200 to perform a voice detection start control of the robot 100 will be described in detail herein. According to the present invention, the voice detection start control process can commence by the robot 100 or the server 200 in a master trigger enable state. For convenience of description, it is assumed that the embodiments of FIGS. 2 and 4 are in the master trigger enable state.

Figure 2:
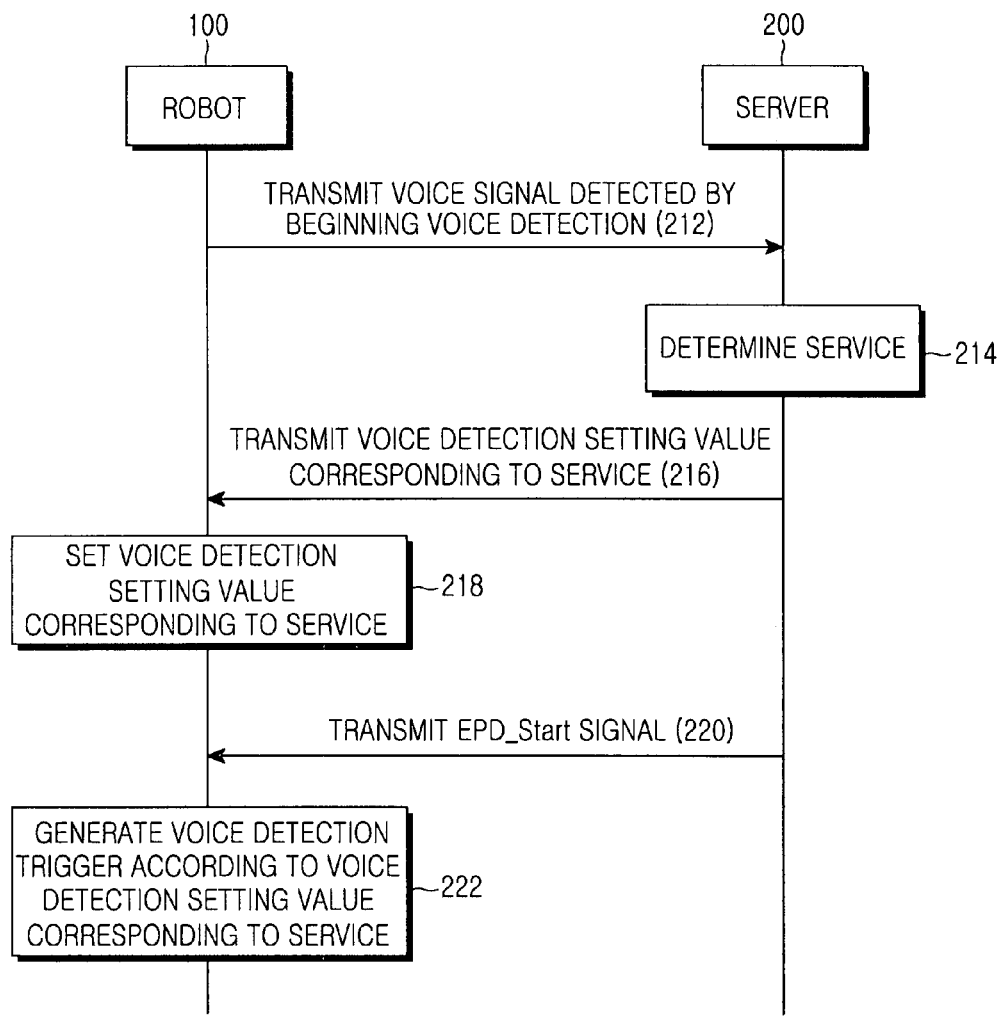
FIG. 2 is a signaling diagram illustrating a method of controlling voice detection of a network robot according to the present invention.

Referring to FIG. 2, a case where the robot 100 commences the voice detection start control process will now be described herein. FIG. 2 is a signaling diagram illustrating a method of controlling voice detection of a network robot according to the present invention.

Figure 3:
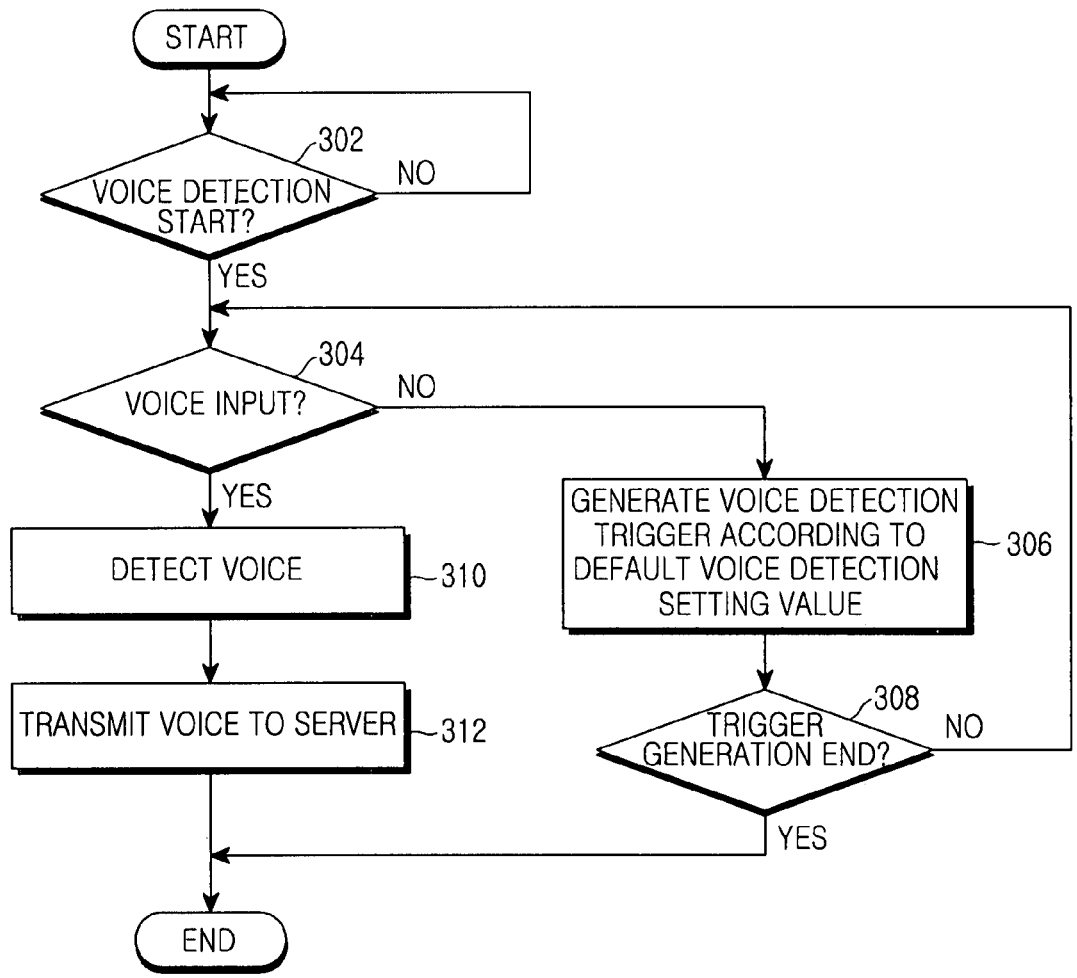
FIG. 3 is a flowchart illustrating a process of transmitting a voice signal from the network robot in the method of FIG. 2, according to the present invention.

Referring to FIG. 2, in step 212, the robot 100 transmits a voice signal detected by commencing voice detection. A detailed description of step 212 is illustrated in FIG. 3. FIG. 3 is a flowchart illustrating a process of transmitting a voice signal from the network robot in the method of FIG. 2, according to the present invention.

Referring to FIG. 3, the robot 100 determines in step 302 whether a voice detection start request is input by a user. For example, the robot 100 can determine that the voice detection start request is input if the user operates a switch (e.g., a touch pad or a remote control) installed in the outside of the robot 100 or if the user calls a name of the robot 100.

If the robot 100 determines in step 302 whether the voice detection start request is input, the robot 100 determines in step 304 whether a voice signal is input by opening the microphone 102. If the robot 100 determines in step 304 that the voice signal is input, the robot 100 detects the input voice signal (e.g., a command for requesting a specific service) in step 310. The robot 100 transmits the detected voice signal to the server 200 in step 312.

If the robot 100 determines in step 304 that the voice signal is not input, the robot 100 generates a voice detection trigger according to a pre-stored default voice detection setting value in step 306. In step 308, the robot 100 determines whether the generation of the trigger ends. Whether the generation of the trigger ends, can be determined according to the default voice detection setting value.

If, in step 308, the robot 100 determines that the generation of the trigger has not ended, the robot 100 performs the voice detection by opening the microphone for a predetermined time in order to wait for the user's voice until the generation of the trigger ends, i.e., iteratively performs steps 304 to 312.

Referring back to FIG. 2, if the voice signal (e.g., a command for requesting a specific service) is transmitted from the robot 100 to the server 200, the server 200 recognizes the voice signal and determines a service provided to or performed by the robot 100 in step 214.

In step 216, the server 200 reads a voice detection setting value corresponding to the service provided to or performed by the robot 100 from among the voice detection setting values stored in the service-based setting value storage unit 204 and transmits the read voice detection setting value to the robot 100.

The robot 100 receives the voice detection setting value corresponding to the service from the server 200 and sets the voice detection setting value corresponding to the service in step 218. In step 220, if a voice detection start (EPD_Start) signal is received from the server 200; the robot 100 performs the voice detection by generating a trigger according to the voice detection setting value corresponding to the service in step 222. Herein, the robot 100 performs voice detection by generating a trigger according to the number of voice detections, a voice detectable duration length, and a voice undetectable duration length according to the service.

In this case, the robot 100 can generate a single trigger or multi triggers according to a service. The single trigger is to perform the voice detection once, and the multi triggers are to perform the voice detection several times in every constant interval. When the single trigger is generated, the robot 100 performs the voice detection once by opening the microphone 102 once for a predetermined time or until the EPD time, and when the multi triggers are generated, the robot 100 performs the voice detection several times by repeatedly opening the microphone 102 for a predetermined time, and then closing the microphone 102.

A case where the voice detection start control process commences by the server 200 will be described herein with reference to FIG. 4. FIG. 4 is a signaling diagram illustrating a method of controlling voice detection of a network robot according to the present invention.

Referring to FIG. 4, the server 200 recognizes in step 402 that a voice detection start event occurs. That is, the server 200 continuously checks a service state of the robot 100, and when the voice detection start event occurs, the server 200 determines a service performed by the robot 100 in step 404.

In step 406, the server 200 reads a voice detection setting value corresponding to the service provided to or performed by the robot 100 from among the voice detection setting values stored in the service-based setting value storage unit 204 and transmits the read voice detection setting value to the robot 100.

In step 408, the robot 100 receives the voice detection setting value corresponding to the service from the server 200 and sets the voice detection setting value corresponding to the service. In step 410, if an EPD_Start signal is received from the server 200, the robot 100 performs the voice detection by generating a trigger according to the voice detection setting value corresponding to the service in step 412. Herein, the robot 100 performs the voice detection by generating a trigger according to the number of voice detections, a voice detectable duration length, and a voice undetectable duration length according to the service.

In this case, the robot 100 can generate a single trigger or multi triggers according to a service. The single trigger is to perform the voice detection once, and the multi triggers are to perform the voice detection several times in every constant interval. When the single trigger is generated, the robot 100 performs the voice detection once by opening the microphone 102 once for a predetermined time or until the EPD time. When the multi triggers are generated, the robot 100 performs the voice detection several times by repeatedly opening the microphone 102 for a predetermined time and then closing the microphone 102.

Figure 5:
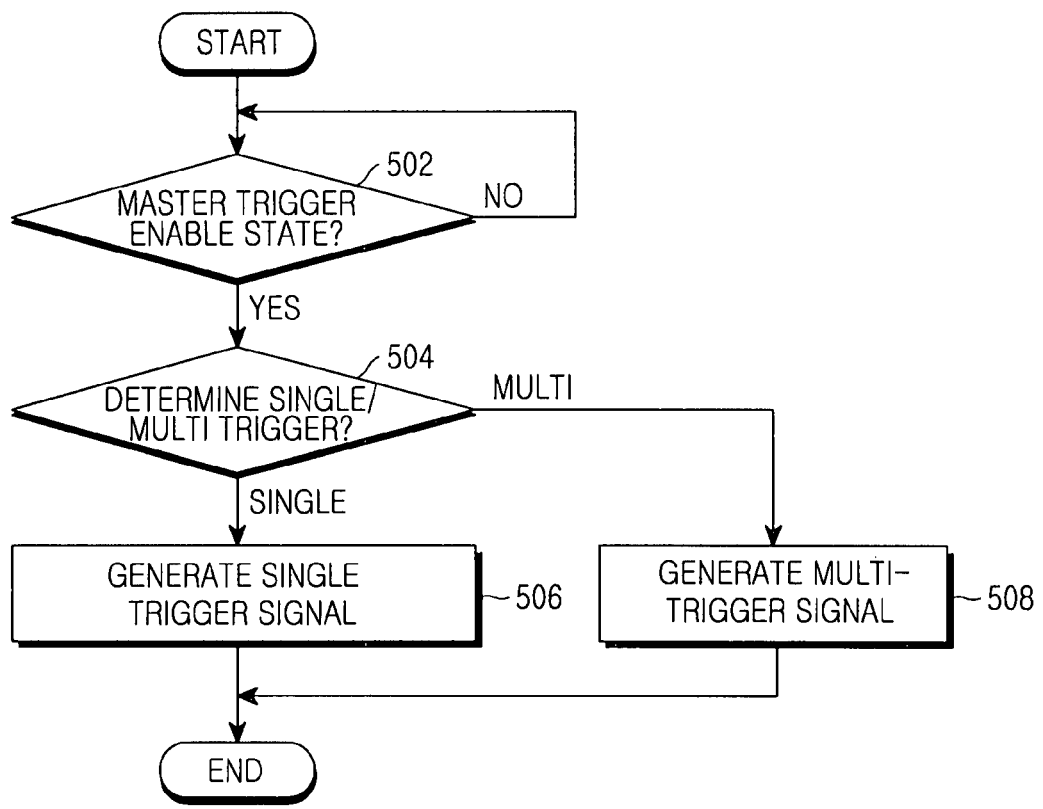
FIG. 5 is flowchart illustrating a process of generating a trigger signal according to the present invention.
Figure 6A:
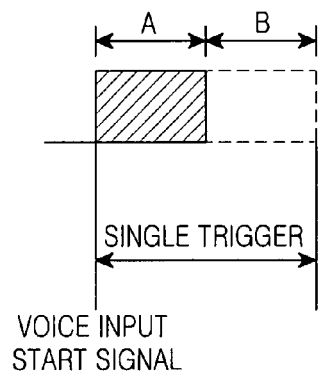
FIGS. 6A and 6B illustrate a single trigger and multi triggers according to the present invention.
Figure 6B:
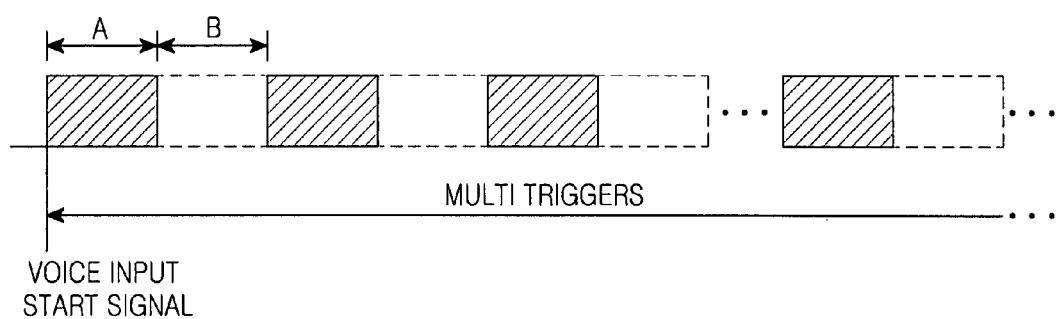

The trigger generation process will be described herein in more detail. FIG. 5 is flowchart illustrating a process of generating a trigger signal according to the present invention. FIGS. 6A and 6B illustrate a single trigger and multi triggers according to the present invention.

Referring to FIG. 5, if the robot 100 receives an EPD_Start signal, the robot 100 determines in step 502 whether the robot 100 is in a master trigger enable state In step 502, upon the robot 100 determining that it is in the master trigger enable state, the robot 100 determines in step 502 whether a voice detection setting value corresponding to a service, which is set by the setting value setting unit 106, corresponds to a single trigger or multi triggers.

If, in step 502, the robot 100 determines that the voice detection setting value corresponding to the service corresponding to the single trigger, in step 506 the robot 100 generates a single trigger signal. As illustrated in FIG. 6A, the single trigger signal includes voice input enable duration A and voice input disables duration B. The voice input enable duration A is a duration in which the microphone 102 is open, and the voice input disable duration B is a duration in which the microphone 102 is closed. If the single trigger signal illustrated in FIG. 6A is generated, the robot 100 performs the voice detection once by opening the microphone 102 once for a predetermined time or until the EPD time.

If the robot 100 determines in step 502 that the voice detection setting value corresponding to the service corresponds to the multi triggers, the robot 100 generates a multi-trigger signal in step 508. As illustrated in FIG. 6B, the multi-trigger signal can include at least two single trigger signals. If the multi-trigger signal illustrated in FIG. 6B is generated, the robot 100 repeatedly performs the voice detection by opening the microphone 102 by the number of times corresponding to the number of voice input enable durations A included in the multi-trigger signal.

Figure 7:
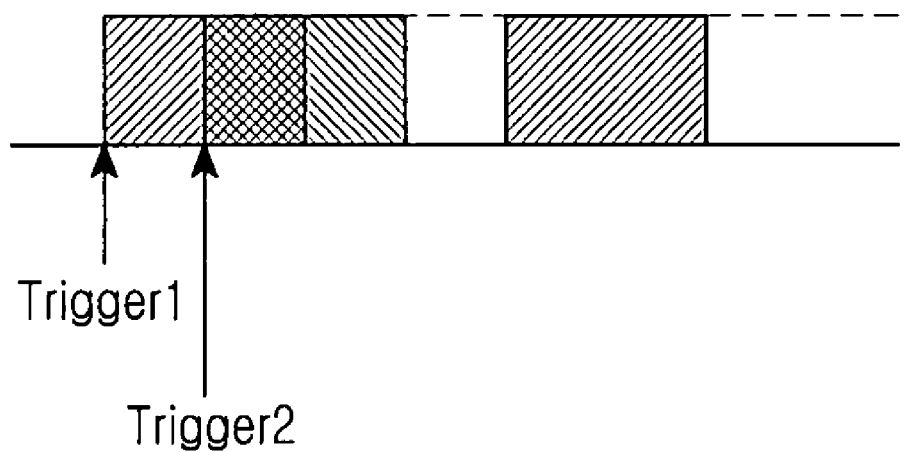
FIG. 7 illustrates overlapped triggers according to the present invention.

In the robot 100, a subsequent trigger signal can be generated during generation of a current trigger signal. FIG. 7 illustrates overlapped triggers according to the present invention. As illustrated in FIG. 7, if a subsequent trigger signal Trigger2 is generated during generation of a current trigger signal Trigger1, until the current trigger signal Trigger1 (single trigger or multi triggers) ends, the subsequent trigger signal Trigger2 is ignored.

As described herein, according to the present invention, by controlling to commence voice detection according to a service, voice detection optimized to a relevant service can commence.

In addition, by controlling a voice detection time in a robot or a server, performance of a network robot system can be improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for controlling voice detection of a network terminal, the system comprising:
the network terminal for, if detection of a voice signal is requested, detecting voice by receiving and setting a voice detection setting value corresponding to a predetermined service from a server and generating a trigger signal for the voice detection according to the voice detection setting value corresponding to the service; and
the server for determining the service of the network terminal and transmitting the voice detection setting value corresponding to the service to the network terminal,
wherein the server transmits to the network terminal a master trigger disable signal for disabling the voice detection by the network terminal or a master trigger enable signal for enabling the voice detection by the network terminal.

2. The system of claim 1, wherein the network terminal is a device whose operation is controlled by the server.

3. The system of claim 1, wherein the voice detection setting value corresponding to the service comprises a number of voice detections, a voice detectable duration length, and a voice undetectable duration length according to the service.

4. The system of claim 3, wherein the network terminal generates a single trigger if the number of voice detections is 1.

5. The system of claim 3, wherein the network terminal generates multi triggers if the number of voice detections is greater than 2.

6. The system of claim 1, wherein the network terminal comprises:
a microphone, which is opened or closed according to a trigger signal and receives a user's voice in an open state;
a voice detector for detecting a voice signal by receiving the user's voice through the microphone, and transmitting the detected voice signal to the server;
a setting value setting unit for storing a default voice detection setting value, and if a voice detection setting value corresponding to a predetermined service is received from the server, setting the received voice detection setting value as a voice detection setting value corresponding to the service; and
a master trigger unit for setting a trigger generation enable state if the master trigger enable signal is received from the server or stopping trigger generation if the master trigger disable signal is received from the server.

7. The system of claim 6, wherein the server comprises:
a voice recognition unit for receiving a voice signal detected by the network terminal and recognizing the received voice;
a service-based setting value storage unit for storing voice detection setting values predetermined according to services;
a controller for determining whether voice detection of the network terminal is controlled by the server, and if it is determined that the voice detection of the network terminal is controlled by the server, determining a service performed by the network terminal and transmitting a voice detection setting value corresponding to the service among the voice detection setting values stored in the service-based setting value storage unit to the network terminal.

8. The system of claim 1, wherein the network terminal determines according to a switch operation of a user whether a voice detection request is input.

9. The system of claim 1, wherein the network terminal determines according to a voice command of the user whether a voice detection request is input.

10. The system of claim 9, wherein the server transmits the master trigger enable signal for requesting to commence the voice detection when a voice detection start of the network terminal is needed and transmits the master trigger disable signal when a voice detection end is needed.

11. The system of claim 10, wherein the network terminal commences the voice detection according to a control of the server if a voice detection start signal is received from the server in a master trigger enable state.

12. The system of claim 10, wherein the network terminal ends the voice detection according to the control of the server if the master trigger disable signal is received from the server.

13. The system of claim 10, wherein the network terminal does not perform the voice detection in a master trigger disable state according to the master trigger disable signal received from the server whether a voice detection request is input by the user.

14. The system of claim 1, wherein the network terminal detects voice by storing the default voice detection setting value, and generating a trigger according to the default voice detection setting value if a voice detection start request is input by the user.

15. The system of claim 1, wherein if a subsequent trigger is generated while a current trigger is being generated, the network terminal ignores the subsequent trigger and performs the generation of the current trigger.

16. A method of controlling voice detection of a network terminal, the method comprising the steps of:
receiving, by the network terminal, a voice detection setting value corresponding to a predetermined service from a server; and
if detection of a voice signal is requested, detecting voice by generating a trigger signal for the voice detection according to the voice detection setting value corresponding to the service,
wherein the server transmits to the network terminal a master trigger disable signal for disabling the voice detection by the network terminal or a master trigger enable signal for enabling the voice detection by the network terminal.

17. The method of claim 16, further comprising:
receiving, by the network terminal, a switch operation of a user; and
determining whether the received switch operation signal is a voice detection request signal.

18. The method of claim 16, further comprising:
receiving, by the network terminal, a voice command of the user; and
determining whether the received voice command is a voice detection request.

19. The method of claim 16, further comprising determining, by the network terminal, that voice detection is requested if a voice detection signal for requesting to commence the voice detection is received from the server in a master trigger enable state.

20. The method of claim 16, further comprising stopping, by the network terminal, trigger generation for the voice detection if the master trigger disable signal for requesting to stop the voice detection is received from the server.

21. The method of claim 20, further comprising not performing, by the network terminal, the voice detection in a master trigger disable state according to the master trigger disable signal received from the server even if a voice detection request is input by the user.

22. The method of claim 16, wherein if a subsequent trigger is generated while a current trigger is being generated, the network terminal ignores the subsequent trigger and performs the generation of the current trigger.

* * * * *